United States Patent [19]
Presby

[11] Patent Number: 5,623,564
[45] Date of Patent: Apr. 22, 1997

[54] SELF-ALIGNED MECHANICAL OPTICAL SWITCH

[75] Inventor: Herman M. Presby, Highland Park, N.J.

[73] Assignee: Lucent Technologies Inc., Murray Hill, N.J.

[21] Appl. No.: 475,708

[22] Filed: Jun. 7, 1995

[51] Int. Cl.⁶ .................................................... C02B 6/26
[52] U.S. Cl. ............................. 385/20; 385/147; 385/43; 385/14
[58] Field of Search ................................ 385/16–23, 147, 385/14, 43

[56] References Cited

U.S. PATENT DOCUMENTS

| 3,860,405 | 1/1975 | Coucoulas et al. | 385/95 |
| 5,159,649 | 10/1992 | Uemura et al. | 385/21 |
| 5,185,825 | 2/1993 | Shigematsu et al. | 385/20 |
| 5,461,683 | 10/1995 | Harman | 385/21 |
| 5,483,608 | 1/1996 | Yokomachi et al. | 385/20 |
| 5,500,917 | 3/1996 | Daniel et al. | 385/92 |

FOREIGN PATENT DOCUMENTS 63-234215 9/1988 Japan ....................................... 385/21

OTHER PUBLICATIONS

N. Kashima, "Passive Optical Components for Optical Fiber Transmission", chap. 13, pp. 307–325 (Artech House 1995).
C.H. Henry et al., "Glass Waveguides on Silicon for Hybrid Optical Packaging," 7 J. Lightwave Technol. pp. 1530–1539 (1989).
Z. Weissman and A. Hardy, "Modes of periodically segmented waveguides," J. Lightwave Technol. vol. 11, No. 11, pp. 1831–1838 (1993).

Primary Examiner—John Ngo
Attorney, Agent, or Firm—Robert E. Rudnick

[57] ABSTRACT

A mechanically stable self-aligned optical switch having a low insertion loss is achieved by employing two silica optical structures containing a plurality of waveguides. The waveguides within each structure are arranged in a common plane. It is possible to achieve such silica optical structures by cleaving a monolithic silica optical structure. In one embodiment, the structures are disposed on respective flat surfaces of moveable and fixed bases that are aligned in a common plane. The structures are further positioned with their cleaved edges adjacent to and facing one another. In this manner, the waveguides of the cleaved structures are effectively self aligned in the direction normal to the flat surface of the bases. In operation, the moveable base moves in the direction along the cleaved edges to selectively provide connections between the waveguides in each structure.

22 Claims, 3 Drawing Sheets

SELF-ALIGNED MECHANICAL OPTICAL SWITCH

INVENTION

The invention relates to optical signal routing and more specifically to a mechanical optical switch configuration with enhanced waveguide alignment.

BACKGROUND OF THE INVENTION

Optical switches have several applications in fiber-optic communication systems. Mechanical optical switches have been used in those switching applications which are wavelength and polarization independent and which do not require very high speed switching. For example, mechanical optical switches have been used in optical fiber routing applications to switch between particular optical signal paths to provide reliable fiber transmission routes for carrying optical signal information. Another exemplary use of mechanical optical switches is to provide connection between each one of a plurality of optical fibers and measuring equipment for testing optical fiber routes or components connected to the optical fibers.

A variety of mechanical optical switch configurations are commercially available. These switches can typically be characterized as either optical-component-moving-type switches or fiber-moving-type switches. Examples of these types of switches are provided in N. Kashima, *Passive Optical Components for Optical Fiber Transmission*, chap. 13, pp. 307–325 (Artech House 1995) (Kashima reference), which is incorporated by reference herein. Examples of optical-component-moving-type switches include configurations that employ moveable mirrors or prisms to selectively redirect light signals from an end of a first optical fiber into an end of a second optical fiber wherein the optical fibers are arranged in a parallel manner with their ends adjacent to each other. A similar switch employs an opaque moveable stop that is selectively inserted between ends of optical fibers that faces one another. However, known optical-component-moving-type switches typically operate as an on-off switches or 1×2 switches and are incapable of providing multiple-port switching, such as in 1×N or M×N switching applications.

Currently available fiber-moving-type switches provide multiple-port switching but are mechanically complex, expensive and most have poor alignment requiring frequent adjustment. For example, one known fiber-moving-type switch configuration uses a moveable fiber connector plug having guide pins, and an array of fixed fiber connector receiver plugs having pin receptacles. In operation, the moveable plug is roughly transported to a desired position to mate with a fixed plug and then precisely aligned by pushing it into the fixed plug to insert the guide pins into the receptacles. This complex and expensive switch configuration is described in greater detail in the above cited Kashima reference.

Another example of a fiber-moving-type switch is produced by Dracon Fiber Optics, Inc. of Berkeley, Calif. This optical switch has a configuration based on expanding a beam of light from optical fibers using grated index (GRIN) rod lens. The optical fibers and lens are mounted on a wheel which rotates a desired fiber into a position in which the beam of light is collected with another lens that focuses it onto a receiving optical fiber. Such a switch configuration is expensive and suffers from poor alignment requiring frequent adjustment.

Accordingly, there is a recognized need for simple, low cost, mechanically stable optical switches that are capable of providing multiple-port switching operations.

SUMMARY OF THE INVENTION

A mechanically stable self-aligned optical switch having a low insertion loss employs two silica optical structures that contain a plurality of waveguides. The silica optical structures can be formed by cleaving a monolithic silica optical structure. The cleaved structures are disposed in the switch with the waveguide arranged in a common plane with their cleaved edges adjacent to and facing one another.. For example, the cleaved structures can be disposed on respective flat surfaces of moveable and fixed bases that are also aligned in a common plane.

In this manner, the waveguides of the cleaved structures are effectively self aligned in the direction normal to the common plane of the waveguides or the flat surfaces of the bases. The use of silica optical structures cleaved from a monolithic light guiding structures advantageously facilitates this self-alignment. As a result of this self-alignment, no further alignment is required in the direction normal to the common plane of the waveguides.

In operation, the moveable base moves in the direction along the cleaved edges to selectively provide connections between the waveguides in each structure as well as alignment in a directional parallel to the plane of the waveguides or the flat surfaces of the bases. One suitable method for moving the moveable base is, for example, a screw-drive-type mechanism with a threaded shaft engaging an internally-threaded sleeve attached to the moveable base. A motor connected to the shaft rotates the shaft in a precise manner to accurately position the moveable base to achieve the desired waveguide connection and alignment. Accordingly, the present invention provides a low cost, mechanically simple and stable self-aligning switch configuration that is able to provide multiple-port switching.

Additional features and advantages of the present invention will become more readily apparent from the following detailed description and accompanying drawings.

DETAILED DESCRIPTION

The present invention is based on the discovery that self-alignment of a mechanical optical switch is achieved by using two silica optical structures that contain a plurality of waveguides which are arranged in a common plane, and that such structures can be formed by cleaving a monolithic silica optical structure. The cleaved structures are disposed in an aligned manner to insure that the waveguides remain in a common plane and with their cleaved edges positioned adjacent to and facing one another. For example, it is possible to disposed the cleaved structures on respective flat surfaces of fixed and moveable bases. Accordingly, since the waveguides of the cleaved structures are maintained in this common plane, they are self-aligned in a direction normal to the common plane of the waveguides or the flat surfaces of the bases. Alignment of the waveguides in a direction parallel to the common plane of the waveguides and connections between the waveguides of the respective structures are produced by moving the moveable base in a direction along the cleaved edges.

Figure 1:
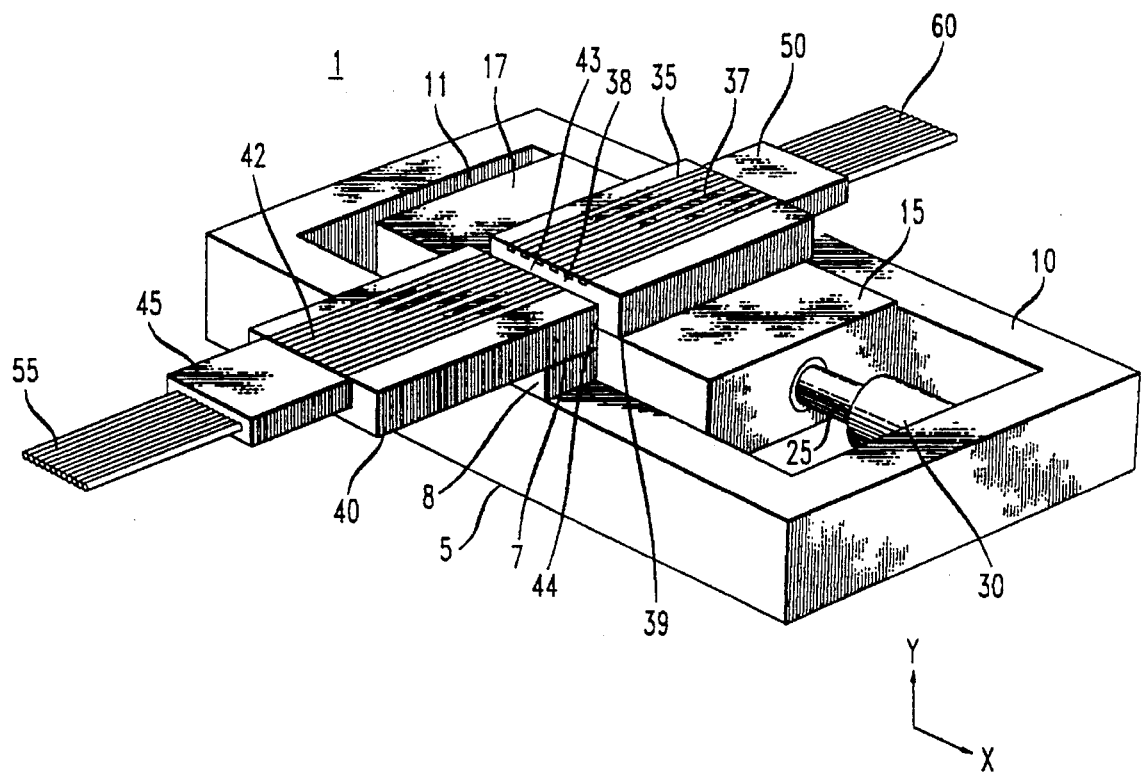
FIG. 1 is a perspective view of an exemplary self-aligned mechanical optical switch in accordance with the present invention.
Figure 2:
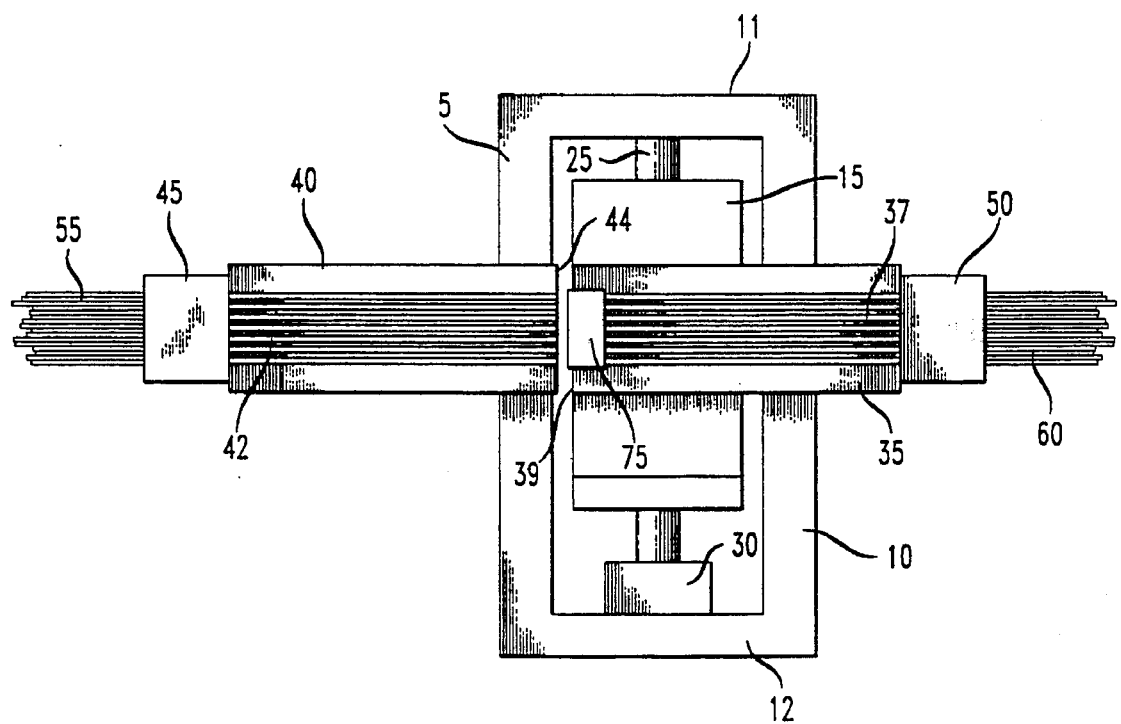
FIG. 2 is a top view of the switch of FIG. 1.

An exemplary mechanical optical switch 1 in accordance with the present invention is shown in FIGS. 1 and 2. The switch 1 includes a fixed base 5 formed integral with or secured to a mounting bracket 10. A moveable base 15 is movably attached to the mounting bracket 10 so as to move the base 15 in a direction x parallel to the fixed base 5. The bases 5 and 15 have flat top surfaces 7 and 17 that are in a common plane with one another. The surface 7 is a top surface of a spacer 8 of the fixed base 5. One suitable technique for ensuring that surfaces 7 and 17 are in a common plane is, for example, to simultaneously machine both surfaces.

A silica optical structure 35 containing a plurality of planar waveguides 37 is disposed on the flat surface 17 of the moveable base 15. Also, a corresponding silica optical structure 40 containing a plurality of planar waveguides 42 is disposed on the flat surface 7 of the fixed base 5. The waveguides 37 and 42 are disposed in a common plane that is parallel to bottom surfaces of the structures 35 and 40 which are in contact with the base surfaces 17 and 7, respectively. Accordingly, since the surfaces 7 and 17 of the bases 5 and 15 are in a common plane, the waveguides 37 and 42 in the structures 35 and 40 are maintained in common plane in the switch 1. Thus, the waveguides 37 and 42 are aligned with one another in a direction y normal to the surfaces 7 and 17.

In order to arrange the waveguides 37 and 42 in a common plane, the corresponding silica optical structures 35 and 40 can be cleaved from a monolithic silica optical structure in accordance with the present invention. An exemplary suitable monolithic silica optical structure is described in greater detail below with regard to FIG. 3. The mounted silica optical structures 35 and 40 have waveguide ends 38 and 43 at cleaved edges 39 and 44 that are close to and face one another along the x-direction as is shown in FIGS. 1 and 2. Optical fibers 55 and 60 carry light signals that are to be routed by the switch 1. Connectors 45 and 50 connect the optical fibers 55 and 60 to the waveguides 37 and 42 of the silica optical structures 35 and 40. Suitable connectors 45 and 50 include, for example, fiber connection chips available from AT&T Network Cable Systems, of Atlanta, Ga.

The silica optical structures 35 and 40 are mounted on the bases 5 and 15 with their cleaved edges 39 and 44 as close together as possible. It is advantageous for a gap separation of the cleaved edges 39 and 44 to be less than 10 μm to maximize the conveyance of light between waveguides of the respective structures 35 and 40 in order to maintain a low insertion loss of approximately less than 0.5 dB. It is further advantageous for the cleaved edges 39 and 44 to be polished to further minimize the insertion loss. In order to further minimize the insertion loss, an index matching material, such as in a gel or liquid form, can be disposed in the gap between the cleaved edges 39 and 44. A suitable index matching gel is available from Cargille Scientific, Inc., of Cedar Grove, N.J. Also, it is possible to form the cleaved edges 39 and 44 at complementary angles with the cleaved edge surfaces remaining parallel to one another in order to minimize any back reflections. Suitable complement any angles are in the range of 5° to 15°.

It is possible to produce different connections between the different individual waveguides of the first and second silica optical structures 35 and 40 by precisely moving the base 15 and the structure 35 in the x-direction to align the respective ones of the waveguides ends 38 and 43 of the desired routing connection. The particular mechanism and method selected to move the base 15 in the x-direction is not critical to practicing the present invention and a variety of conventional methods can be employed. An exemplary screw-drive arrangement for moving the base 15 is shown in FIGS. 1 and 2 for illustration purposes only and is not meant to be limitation of the present invention.

The illustrated screw-drive mechanism includes a threaded shaft 25 that is rotatably attached to a first end 11 of the bracket 10 and extends through an internally-threaded sleeve 20 of the base 15, seen in FIG. 1. The shaft 25 is further attached to a controllable motor 30, best seen in FIG. 2, which is secured to a second end 12 of the mounting bracket 10. The motor 30 rotates the threaded shaft 25 causing the threaded sleeve 20 to travel across the threads of the shaft 25. As a result, the moveable base 15 also moves along the shaft 25 in the x-direction. The motor 30 enables precise control of the position of the moveable base 15 and silica optical structure 35 in the x-direction by controlling the number of rotations of the shaft 25. Suitable motors for the motor 30 include, for example, D. C. and stepper motors.

The particular motor controller (not shown) chosen to control the motor 30 for positioning the base 15 to produce the various waveguide connections and alignment in the x-direction is not critical for practicing the present invention. A suitable motor controller is, for example, a conventional computer, such as a personal computer, with the appropriate hardware and/or software for providing the motor 30 with the necessary movement instructions. In addition, it is possible for the motor controller to determine and achieve the proper alignment in the x-direction by monitoring the amount of stray light that is deflected at the cleaved edges 39 or 44 due to a misalignment. Accordingly, an optional light detector 75, such as a pin diode, is shown in FIG. 2 mounted above the cleaved edge 39 to monitor stray light. For illustration purposes, the optional light detector 75 is not shown in FIG. 1.

Although the switch 1 is shown using a spacer 8 to provide the flat surface 7 that is in a common plane with the moveable base flat surface 17, it should be readily understood that other mechanical configurations can be used to provide the flat surfaces 7 and 17 in practicing the present invention. For example, it is possible to provide the flat surfaces 7 and 17 using two spacers with one on each base 5 and 15 or the omission of spacers where corresponding mounting portions of the bases are in the same plane.

Figure 3:
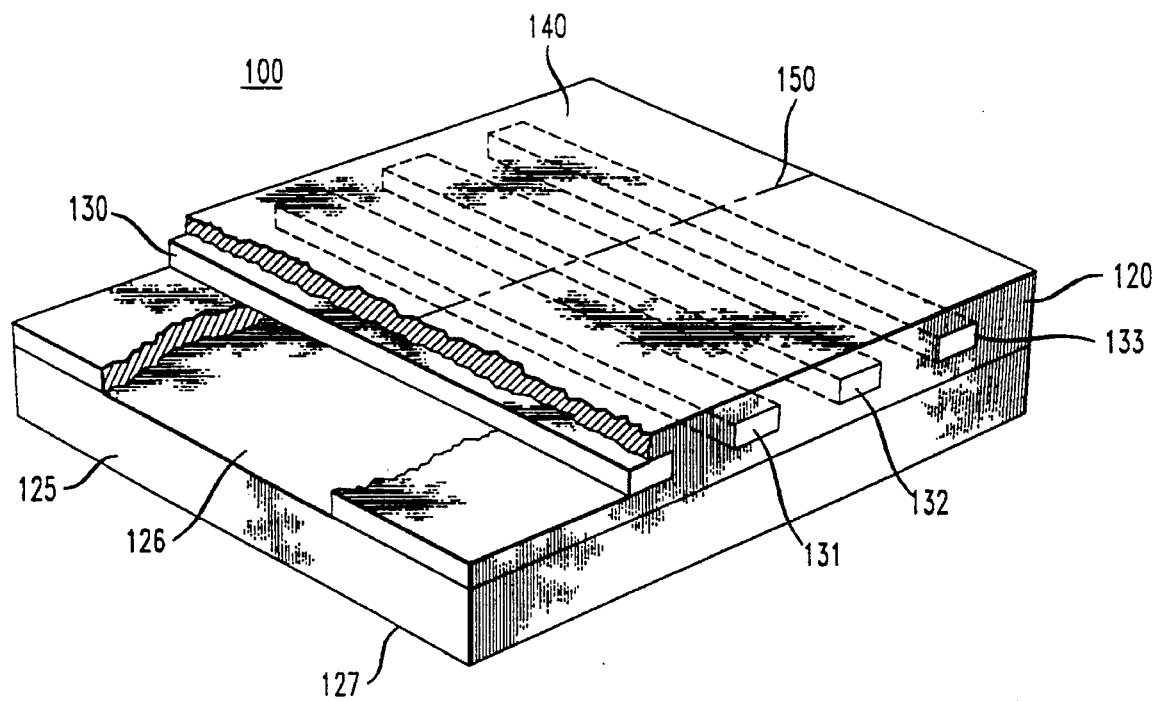
FIG. 3 is perspective partial cut-away view of a exemplary monolithic silica optical structure that can be used to form cleaved optical silica structures in the switch of FIGS. 1 and 2.

An exemplary monolithic silica optical structure 100 for use in forming the silica optical structures 35 and 40 is shown in FIG. 3. The silica optical structure 100 has silica ($SiO_2$) glass 120 formed on a substrate 125, such as a silicon wafer substrate. The silicon substrate 125 provides a foundation having a substantially flat top and bottom surfaces 126 and 127 upon which a waveguide structure can be formed and can have a thickness, for example, on the order of 0.5 mm. While the proceeding description relates to silica on silicon waveguide devices, it should be understood that it is possible to fabricate the structure 100 on other substrate materials such as fused quartz, lithium niobate or ceramic.

Waveguides 130, 131, 132 and 133 are formed within the silica glass 120 to produce a 4×4 switch in accordance with the present invention. Fabrication techniques, such as lithography, etching, low pressure vapor chemical deposition, and flame hydrolysis, are useful in fabricating the waveguides 130–133. An exemplary fabrication process for the silica optical circuit 100 is as follows: a base layer of silica glass is deposited on the substrate 125, and a thin core layer of doped silica glass is deposited on this silica glass layer; the core layer is then configured to the desired waveguide structures 130–133 using standard photolithographic techniques; and a layer of doped silica glass is then deposited over the core layer to act as a top cladding. A suitable doping profile for the doped silica glass is uniform step-index distribution.

The silica glass top cladding and the base layer of silica glass form the silica glass 120 shown in FIG. 1. Suitable thicknesses for the base silica layer, core layer and top cladding layer are 10 to 20 µm, 4 to 8 µm and 10 to 20 µm, respectively. Thicknesses less than 10 µm for the base silica layer are undesirable because of light loss to the substrate while thickness greater than 20 µm are generally disadvantageous because of long deposition times required to form such thicknesses. For a detailed discussion of glass waveguides on silicon and the fabrication thereof, see, for example, C. H. Henry et al., "Glass Waveguides on Silicon for Hybrid Optical Packaging", 7 J. Lightwave Technol., pp. 1530–1539 (1989), which is incorporated by reference herein. Although the above exemplary fabrication method produces waveguides within the silica glass 120 that are completely buried, it is possible to fabricate such waveguides within the silica glass 120 near a silica glass top surface 140 or which are only partially buried.

The waveguides 130–133 extend through the silica glass 120 and are substantially parallel to a bottom surface 127 of the silica optical structure 100. In order to form the silica optical structures 35 and 40 of FIGS. 1 and 2, the silica optical structure 100 is cleaved into two parts across the waveguides 130–133 in a straight line, such as at the dashed line 150 in FIG. 3. Suitable cleaving methods include, for example, sawing with a diamond blade dicing saw or diamond scribing and then bending to produce the structure separation. The separation between each waveguide within the respective waveguides 37 and 42 is not critical for practicing the present invention. However, it is generally desirable that the separation be greater than 10 m because of stray light rejection of adjacent waveguides. The waveguide separation can conveniently be 250 µm which is a standard separation employed in commercially available fiber connection chips.

Since the waveguides 130–133 are precisely formed within the silica glass 120 to extend parallel to the bottom flat substrate surface 127, the resulting waveguide ends 38 and 43 formed after cleaving, as shown in FIG. 1, are aligned in the y-direction when the cleaved structures 35 and 40 are mounted on the aligned flat base surfaces 7 and 17. The desired switch connection and alignment in the x-direction are achieved by movement of the moveable base 15. The desired alignment resolution is attained by selecting the appropriate thread spacing of the shaft 25 and rotation resolution of the motor 30. Although each of the waveguides 130–133 is shown parallel to the bottom surface 127 along their entire length, it should be understood that the waveguides need only be parallel to the bottom surface 127 in a region where the structure 100 is to be cleaved.

Figure 4A:
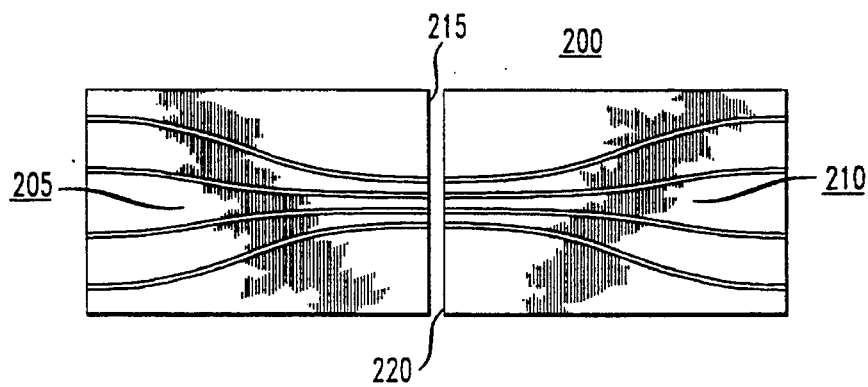
FIG. 4A–C are top views of alternative exemplary silica optical structures to the silica optical structure of FIG. 3.
Figure 4B:
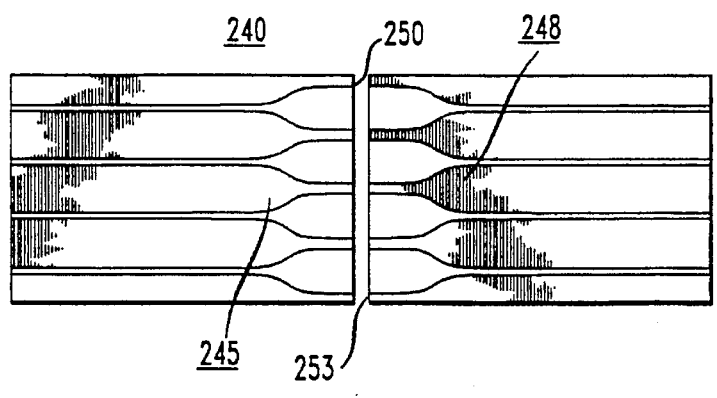
Figure 4C:
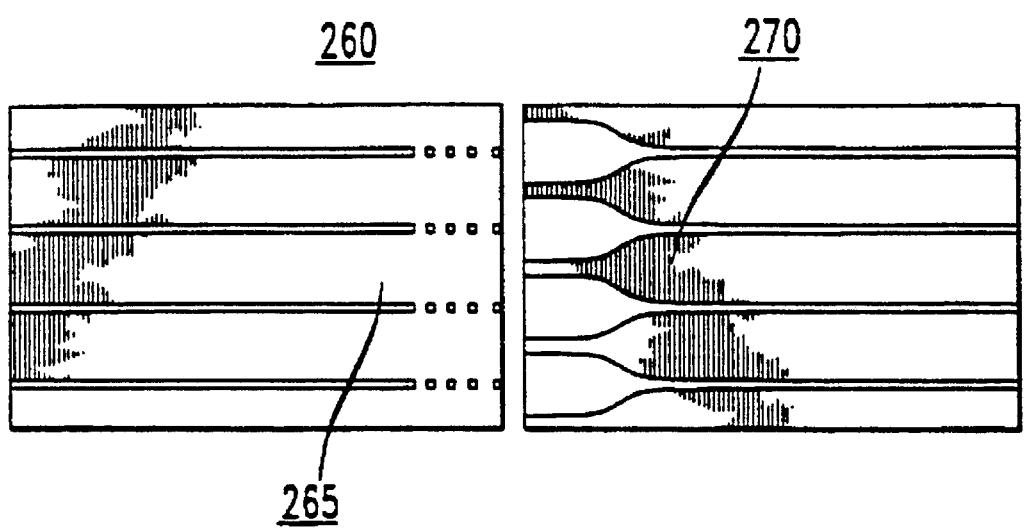

The use of silica optical structures in the present invention permits implementation of different advantageous waveguide configurations. For example, FIGS. 4A–C illustrate silica optical structures 200, 240 and 260 for use as the silica optical structures 35 and 40 of FIGS. 1 and 2 that employ different exemplary waveguide configurations. The waveguide structures 200, 240 and 260 were cleaved from corresponding monolithic silica optical structures in a substantially similar to that described above with regard to FIG. 3. In FIG. 4A, waveguides 205 and 210 of the waveguide structure 200 are spaced closer to one another in a region near cleaved edges 215 and 220. As a consequence, smaller movement is required to make the switch connections resulting in faster switching times. Waveguide separations of less than 10 µm near the cleaved edges 210 and 215 is generally disadvantageous because of undesirable stray light collection by waveguides adjacent to a waveguide carrying a light signal.

The silica optical structures 240 and 260 of FIG. 4B–C expand a beam of light traveling through any one of the corresponding waveguides 245 and 248, and 265 and 268 to reduce the alignment tolerances required for switch connections while maintaining adequate insertion loss. In FIG. 4B, the first waveguides 245 are tapered outwardly near a cleaved edge 250 to expand a beam of light transmitted through a one of waveguides 245 at a region near the cleaved edge 250. The waveguides 248 are also tapered near a corresponding cleaved edge 253 to provide an enlarged collection area for receiving the expanded beam of light. Suitable increases in the waveguide diameter for the tapers are, for example, approximately in the range of 10% to 50%. An increase of greater than 50% in waveguides for the taper is generally undesirable because of corresponding increased loss. In operation, the tapered waveguides of the silica optical structures 240 permit the use of lower alignment tolerances for waveguide connections than with non-tapered waveguides.

In a similar manner, the waveguides 265 in the silica optical structures 260 of FIG. 4C expand a beam of light by using a series of waveguide segments 275 near a cleaved edge 280. The segments 275 create sufficient discontinuities to expand the beam of light. A suitable number of segments for this purpose is, for example, on the order of approximately 50. It is possible for each of the segments to have a length in the range of several microns and, likewise, the separation between the segments to be in the range of several microns. A more detailed description of expanding a beam of light using a segmented waveguide is provided in Z. Weissman and A. Hardy, "Modes of periodically segmented waveguides," J. Lightwave Technol., vol. 11, no. 11, pp. 1831–1838, (1993), which is incorporated by reference herein. Tapered waveguide ends 285 of the waveguides 270 collect the expanded beam of light from the segmented waveguides 265.

It should be understood that many different silica optical structure configurations can be employed in accordance with the present invention without departing from the teaching thereof. The exemplary configurations shown in FIGS. 4A–C are for illustration purposes only and are not meant to be a limitation of the present invention. In an alternative embodiment of the present invention, a second fixed base is substituted for the moveable base 15. A surface of the second fixed base is arranged in a common plane with the surface 7 of the fixed base 5. The silica optical structure 35 is movably disposed on the second fixed base surface. In operation, the silica optical structure 35 is moved across the second fixed base in order to form the waveguide connections.

Further, although several embodiments of the present invention have been described in detail above, many modifications can be made without departing from the teaching thereof. All of such modifications are intended to be encompassed within the following claims. For instance, it is possible to use a variety of switch configurations including a 1×N, or an M×N configuration. Further, a light signal received by a receiving waveguide in the silica optical structure can be looped-back to a transmission waveguide of the switch to route the same signal elsewhere. It is also possible to arrange a switch according to the present invention in a ganged stage configuration with the output of one switch stage being the input of a next stage.

The invention claimed is:

1. An optical mechanical switch comprising:

a fixed base; and first and second silica optical structures cleaved from a monolithic silica optical structure, each of the first and second silica optical structures having a corresponding cleaved edge and containing at least one waveguide, a surface of the first structure being coupled to a surface of the fixed base, a corresponding surface of the second structure being coupled to a surface in a common plane with said fixed base surface, and the cleaved edge of the second structure being arranged adjacent to and facing the first structure's cleaved edge, wherein the second structure is moveable in a direction along the cleaved edges to selectively provide connections and alignment of the waveguides of the respective structures.

2. The switch of claim 1 further comprising a moveable base, wherein the second silica optical structures is coupled to a surface of the moveable base.

3. The switch of claim 1 wherein at least one of the silica optical structures contains at least two waveguides with the waveguides being arranged in a common plane.

4. The switch of claim 1 wherein one of the silica optical structures has at least two waveguides which are tapered proximate the cleaved edge.

5. The switch of claim 1 wherein the waveguide in each structure is larger proximate the cleaved edge.

6. The switch of claim 1 wherein the waveguide in one of the structures is segmented proximate the cleaved edge.

7. The switch of claim 1 wherein a gap between the cleaved edges of the structures is less than 10 μm.

8. The switch of claim 7 further comprising a light detector proximate a gap between the cleaved edges of the structures.

9. The switch of claim 7 further comprising an index matching material disposed in the gap.

10. The switch of claim 2 wherein the moveable base is moveable by a threaded shaft operatively connected to a motor.

11. The switch of claim 10 wherein the motor is a DC motor.

12. The switch of claim 2 wherein the fixed base is secured to a bracket and wherein the moveable base is movably mounted to the bracket.

13. The switch of claim 3 wherein the waveguides are positioned closer together proximate the cleaved edge in the silica optical structures containing at least two waveguides.

14. A method of producing an optical mechanical switch comprising:

cleaving a monolithic silica optical structure into first and second silica optical structures, each of the first and second silica optical structures having a corresponding cleaved edge and containing at least one waveguide;

positioning the first structure on a fixed base; and positioning the second structure aligned with its cleaved edge adjacent to and facing the first structure cleaved edge, wherein the second structure is moveable in a direction along the cleaved edges to selectively align the respective waveguides.

15. The method of claim 14 further comprising disposing at least two waveguides in at least one of the silica optical structures with the waveguides in a common plane.

16. The method of claim 15 further comprising positioning the waveguides closer together proximate the cleaved edge.

17. The method of claim 14 further comprising tapering proximate the cleaved edge.

18. The method of claim 14 wherein at least one waveguide is segmented proximate the cleaved edge.

19. The method of claim 14 wherein a gap formed between the cleaved edges of the structures is less than 10 μm.

20. The method of claim 19 further comprising detecting a misalignment of the waveguides by detecting stray light at the gap between the cleaved edges.

21. The method of claim 19 further comprising disposing an index matching material in the gap.

22. The method of claim 16 further comprising:

aligning a flat surface of the fixed base with a flat surface of a moveable base in a common plane; and disposing the second structure on the moveable base flat surface, wherein the first structure is disposed on the fixed base flat surface and wherein the second structure is moved by movement of the moveable base.

* * * * *